United States Patent [19]

Gasper

[11] Patent Number: 4,492,499
[45] Date of Patent: Jan. 8, 1985

[54] FRAME FIXTURE ARRANGEMENT

[75] Inventor: John S. Gasper, Fort Wayne, Ind.

[73] Assignee: North American Van Lines, Inc., Fort Wayne, Ind.

[21] Appl. No.: 520,719

[22] Filed: Aug. 5, 1983

Related U.S. Application Data

[63] Continuation-in-part of Ser. No. 252,026, Apr. 8, 1981, abandoned.

[51] Int. Cl.³ .............................. B60P 7/10; B60P 7/14; B61D 45/00
[52] U.S. Cl. ....................................... 410/32; 206/454; 248/214; 403/217; 410/34; 410/143; 410/155
[58] Field of Search ................ 248/58, 214; 403/217; 410/31, 32, 33, 34, 38, 41, 99, 120, 143, 155, 156; 206/449, 454

[56] References Cited

U.S. PATENT DOCUMENTS

| | | | |
|---|---|---|---|
| 2,840,288 | 6/1958 | Broddon | 410/120 X |
| 2,908,474 | 10/1959 | Chiarito | 410/32 |
| 3,154,026 | 10/1964 | Klasing, Jr. | 410/41 |
| 3,307,691 | 3/1967 | Vallebona | 410/41 X |
| 3,595,176 | 7/1971 | Broling | 410/33 |
| 3,769,774 | 11/1973 | Barnes | 248/58 X |
| 3,837,408 | 9/1974 | Green | 248/214 X |
| 3,890,759 | 6/1975 | Selden et al. | 403/217 |

Primary Examiner—Howard Beltran
Attorney, Agent, or Firm—Scully, Scott, Murphy & Presser

[57] ABSTRACT

A frame fixture having a support base, receiving plate, a pair of carrier bolts and a post, the fixture is placed onto the top of a telephone switchgear frame so that the base grips the frame. The post has two carrier bolts extending therefrom and further has a cargo bar placed transversely to the bolts and is located therebetween. A receiving plate is attached to the bolts to fasten the cargo bar between the post and plate. A plurality of spaced switchgear frames in a transport vehicle are adapted to be interconnected by the cargo bar so as to prevent toppling of the former about their bases.

6 Claims, 5 Drawing Figures

4,492,499

FRAME FIXTURE ARRANGEMENT

CROSS-REFERENCE TO RELATED PATENT APPLICATIONS

This application is a continuation-in-part of patent application Ser. No. 252,026; filed Apr. 8, 1981, now abandoned.

BACKGROUND OF THE INVENTION

1. Field of the Invention

The present invention relates generally to equipment for assisting in the transportation of goods within a transport vehicle, and more particularly pertains to a clamping configuration of the frame fixture type which enables goods within a transport vehicle to be securely fastened and safely transported therein.

Certain types of physically cumbersome products present considerable problems during their transportation. Particularly, such goods must often be transported within a transport vehicle over long distances thereby necessitating secure fastening to prevent toppling about their bases, which may cause extensive breakage as a result thereof to the goods themselves and to any other goods stored and transported within the vehicle. Large electronic equipment, such as telephone switchgear frames which are not readily susceptible of being packaged in an outer protective shipping container, are illustrative of the types of goods which inherently have the problems referred to above and to which the present invention is directed. Specifically, such switchgear can be damaged if toppled during transit due to the electronic wiring and mechanisms which are normally extensively exposed. Further, any immediate damage caused to the goods as a result of toppling may be greatly compounded because the operator of the transport vehicle may remain unaware of any toppling that has occurred and subsequent additional damage due to the sliding or rolling of the gear may occur during transit.

The inventive arrangement of the present invention effectively provides a novel arrangement for the stabilization and secure fastening of such cumbersome products during their transportation, by providing a clamping system in the nature of a frame fixture which effectively fastens, albeit indirectly, each good to the other so that no individual telephone switchgear frame can fall or topple during transit.

2. Discussion of the Prior Art

The present inventive arrangement effectively obviates the aforementioned problems related to the transportation of goods, particularly telephone switchgear, which may occur in transit. To effect this result, the inventive concept utilizes a unique configuration of receiver plate and post with support base to attach the goods in transit to a cargo bar to thereby effectively interlink the goods transported in the transport vehicle.

Well known methods of securing the switchgear frames include the use of straps and furniture pads. Typically, the furniture pads were placed between the switchgear frames; the pads were in turn fastened to the sides of the trailer with heavy nylon straps. The problem associated with this method of securing the switchgear frames was that, despite these efforts, the switchgear frames were subject to some movement and would in fact press against each other subsequently causing damage. The present invention, as described herein, completely alleviates this problem by effectively providing a simple to install, and remove, frame fixture which successfully prevents any movement of, and any resultant damage to, the switchgear frames while in transit.

None of the prior art, of which Selden, et al. U.S. Pat. No. 3,890,759, Green U.S. Pat. No. 3,837,408, and Barnes, U.S. Pat. No. 3,769,774 are typical, even suggest the present invention's functionality or design in treating the aforementioned problems.

As illustrated in Selden, et al. U.S. Pat. No 3,890,759 the invention therein discloses a connector for attaching angularly displaced members, and is particularly drawn to crossarms on power lines to prevent the racking and twisting of the crossarms due to high winds or other external forces. Selden, et al. provide a post connector having a pair of horizontal crossarms attached to a vertical post. Each crossarm has a vertical groove to receiptably receive electrical wire thereby concealing the wire within the connector. A center plate is provided with a key which fits into a groove of the crossarm to thereby prevent the crossarm from twisting on the pole. Unlike the present invention, this patent teaches the use of keys and grooves to prevent twisting. The present invention is primarily concerned, however, with the prevention of falling, or the toppling of, products within a transport vehicle and not with any twisting action. Consequently, the keys and grooves of the prior art are not related in any way to the present invention. Although this reference is not considered to be particularly relevant, it is included to describe the general state of the art.

Green U.S. Pat. No. 3,837,408 discloses a tool bar mounting clamp to be carried by a propelling vehicle for mounting earth-working implements. A clamp plate is provided therein to engage a tool bar. Although the frame fixture is not directed to tool bars or propelling vehicles, this reference is being cited to show this general type of mounting clamp.

Barnes U.S. Pat. No. 3,769,774 discloses a steel deck insert for attaching a member such as a false ceiling below a steel member. This reference is being provided to merely show another apparatus for the fastening of two steel members. This publication is not considered to be particularly relevant.

Among other prior art patents representative of holddown or clamping arrangements there may be found Chiarito U.S. Pat. No. 2,908,474; Broddon U.S. Pat. No. 2,840,288; and Klasing, Jr. U.S. Pat. No. 3,154,026.

Chiarito U.S. Pat. No. 2,908,474 relates to a hold down device for clamping together a plurality of superimposed glass plates which are stacked upright on a glass plate transport vehicle. A vertical bar includes an extensible arm which may be adjusted and pivoted to exert clamping pressure against the stacked glass plates. There is no disclosure of a cargo bar which fixedly interconnects a plurality of frame fixture devices so as to prevent a number of items from toppling relative to each other in a transport vehicle.

Broddon U.S. Pat. No. 2,840,288 discloses an article holder forming a component of truck rack so as to maintain the articles in an predetermined fixed position relative to the frame of the truck. There is no disclosure of a cargo bar interconnecting a plurality of frame fixture devices as in the present invention.

Klasing, Jr. U.S. Pat. No. 3,154,026 discloses a tiedown clamp connected to a system of chains or cables for clamping a load on a flatbed truck. This prior art arrangement would not be applicable to a cargo bar structure fixedly interconnecting a plurality of frame fixtures to prevent goods being transported in a vehicle cargo bay from toppling over and being damaged.

The present invention, unlike the prior art, provides a relatively simple and inexpensive apparatus in the nature of a frame fixture system for the fastening and positional stabilizing of goods within a transport vehicle to maintain the spatial relationship thereof while in transit. None of the prior art cited discloses an apparatus even relevant to the present invention herein described.

SUMMARY OF THE INVENTION

Accordingly, it is a primary object of the present invention to provide a novel frame fixture to securely fasten cumbersome products which tend to topple about their bases, particularly the frames of telephone switchgears, within a transport vehicle.

Another object of the present invention is to provide a frame fixture which is easily adjustable by the user, thereby creating a simple yet remarkably effective means for maintaining the spatial relationship between the goods and stability of the latter throughout their transportation while positioned within the transport vehicle.

Still, another object of the present invention is to provide an effective means for maintaining the spatial relationship and stability of the goods while in transit yet provide ease in disassembly to provide further ease in the unloading thereof.

The present invention provides a novel frame fixture system for securely fastening goods which have a tendency to topple about a base axis, such as telephone switchgear frames, to an elongated cargo bar to interconnect the switchgears within the transport vehicle so as to thereby maintain the spatial relationships of the switchgears therein. In the typical loading situation, once the switchgear units are placed in the cargo bay of the vehicle, cargo bars are installed above the switchgear units running transverse to the length of the switchgear units. The frame fixture devices of the present invention are attached to the cargo brace bars, after the base of the frame fixture has gripplingly engaged the switchgear frames. By fastening numerous switchgear frames to a single cargo bar, pursuant to the invention as herein described, the switchgear frames are thereby interlinked and each individual item is prevented from toppling with respect to the other goods within the transport vehicle. The bases of the switchgear units may then be further secured with lumber and straps.

BRIEF DESCRIPTION OF THE DRAWINGS

The foregoing and other objects, advantages and characterizing features of the inventive fastening arrangement of the present invention will become clearly apparent from the ensuing detailed description of an illustrative embodiment thereof, taken together with the accompanying drawings wherein like reference numerals denote like parts through the various views and in which.

DESCRIPTION OF THE PREFERRED EMBODIMENTS

Figure 1:
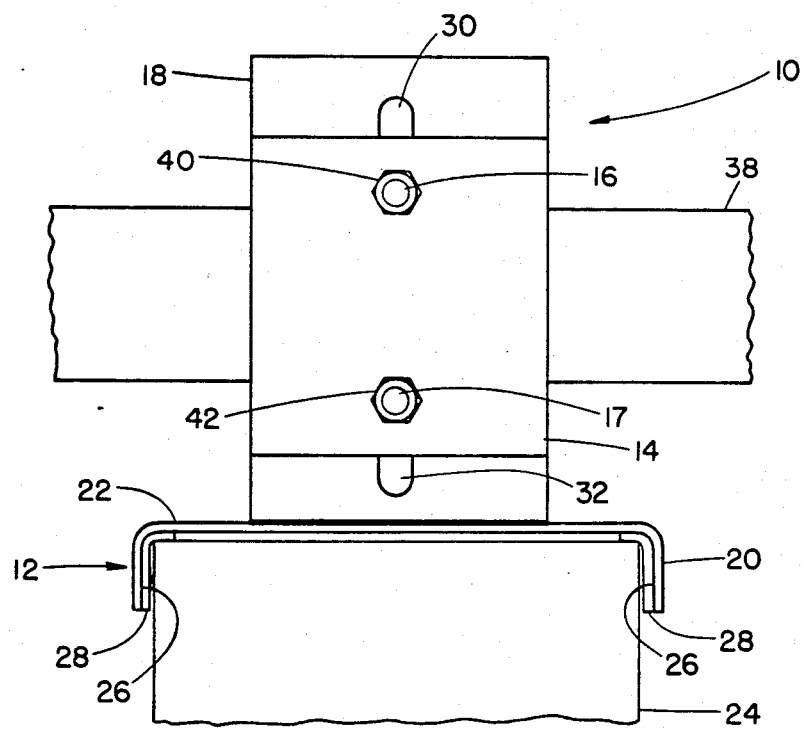
FIG. 1 is a front view of the frame fixture fully assembled.
Figure 2:
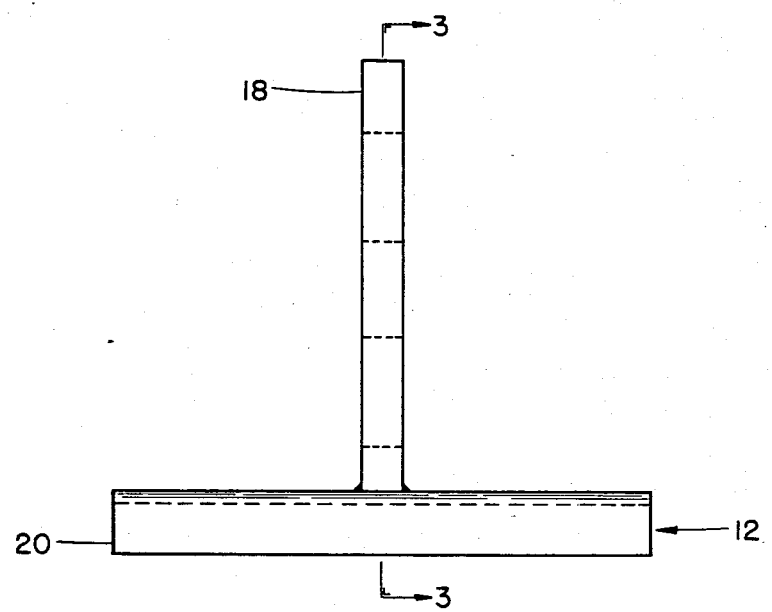
FIG. 2 is a side view of the base and post.
Figure 3:
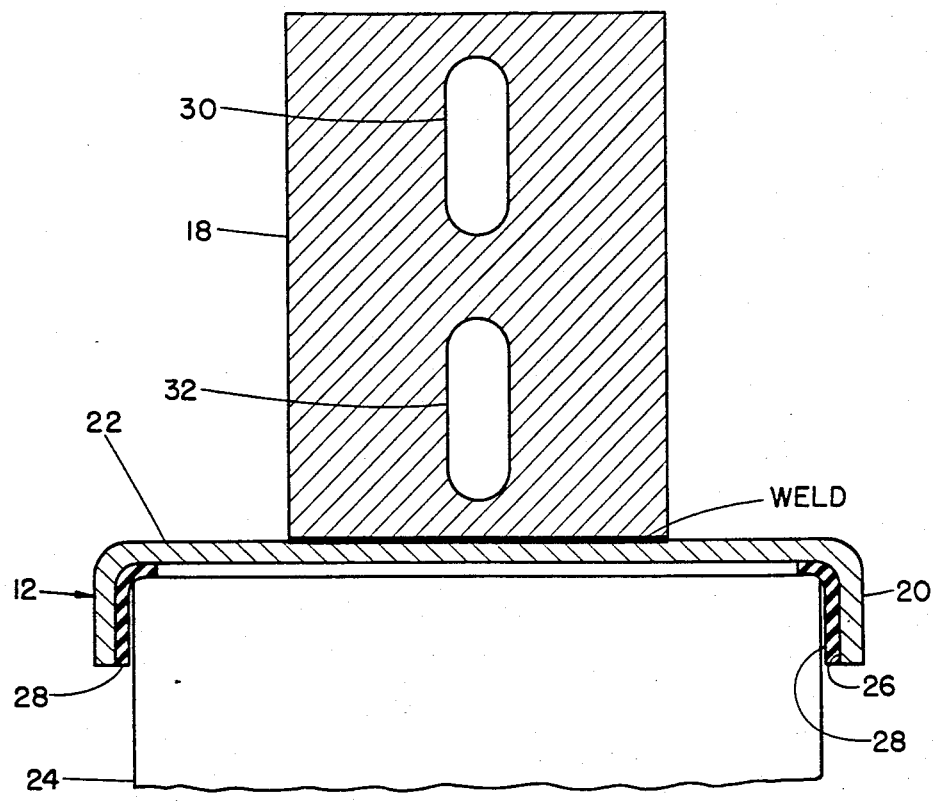
FIG. 3 is a front sectional view, taken about line 3—3, of the base and post.
Figure 4:
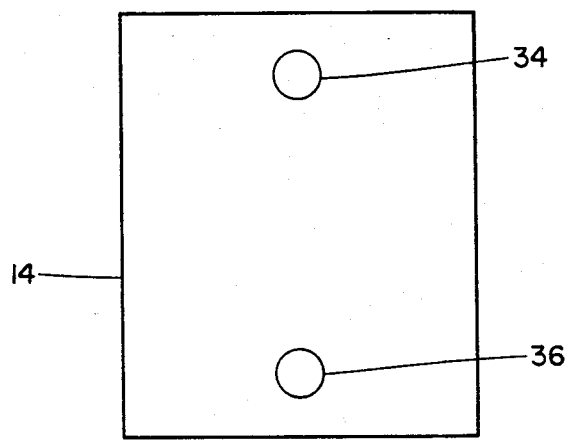
FIG. 4 is a front view of the receiver plate.

Referring now in detail to the drawings, in FIG. 1 there is shown a frame fixture 10 of the present invention having the components of support base 12, a receiving plate 14, a pair of carrier bolts 16 and 17, and a post 18. The base 12 has bent ends 20, along with the platform 22 of the base 12, define a channel in which an elongated product 24 can be securely held. Along the inner face 26 of the bent ends 20, a resilient pad 28 is placed to provide a seal between the product 24 and the base 12. This pad provides cosmetic protection to the surface of the product 24, as well as providing a gripping means, by effectively preventing any contact between the finished surface of the product 24 and the base 12.

The base 12 has a post 18, generally rectangular in configuration, protruding from the platform 22 of the base 12, and is attached thereto, preferably by welding. The rectangular post 18 has two slots therein, 30 and 32, one disposed above the other, both longitudinally extending along the length of the post 18. The slots are large enough to receivably engage carriage bolts 16 and 17, which in a preferred embodiment are $\frac{3}{8}''$ in diameter. The slots 30,32 inherently provide the ability to adjust the height of the carriage bolts 16 and 17 in relationship to the platform 22 of the base 12. This capability allows the entire frame fixture 10 to be adjusted relative to the cargo bar 38 thereby allowing a single cargo bar to be utilized for numerous switchgear frames which vary slightly in height.

The receiving plate 14 has two holes 34 and 36 placed one above the other to receive the carriage bolts 16 and 17 which extend from the post 18. The holes are preferably centered along the longitudinal axis of the plate 14, and are spaced a distance equal to the width of the cargo bar 38, which is normally approximately 4 inches. The carriage bolts 16 and 17 can then be fastened to the receiving plate 14, through the use of nuts 40 and 42 thereby fastening the frame fixture 10 and the gripped product 24 to the cargo bar 38 creating a stable and completely secure configuration thereof.

In operation, products 24, such as telephone switchgear, are loaded onto a transport vehicle by any of the well known devices for loading presently available in the art. Cargo bars 38 are then placed along the tops of the switchgear generally perpendicular to the length of the switchgear units 24. The frame fixtures 10 then grippingly engage the product by the utilization of the channel as defined by the curved ends 20, and the platform 22, of the support base 12. The frame fixtures 10 are then fastened to the cargo bar 38 by placing the plate 14 so as to be oppositely disposed to the post 18 and having the cargo bar 38 placed therebetween, fastening the plate 14 to the post 18 by threading the carriage bolts 16 and 17 through the slots 30 and 32 of the post 18 and the plate holes 34 and 36 and securing the bolts with nuts 40 and 42. In this manner the switchgear 24 becomes fastened to the cargo bar 38 thereby providing a cargo bar with numerous goods fastened thereto. Through this fastening the gear frames become interconnected to each other thereby providing a highly stable network of products within the transport vehicle. It is also noted that the bottoms of the switchgears may be prevented from slipping or moving during transit by the use of lumber and straps, a well known method of fastening within transport vehicles. It should also be realized that more than one frame fixture per product can be utilized to connect the particular good to more than one cargo bar and the number of bars utilized is solely dependent upon the degree of stabilization desired by the user.

Figure 5:
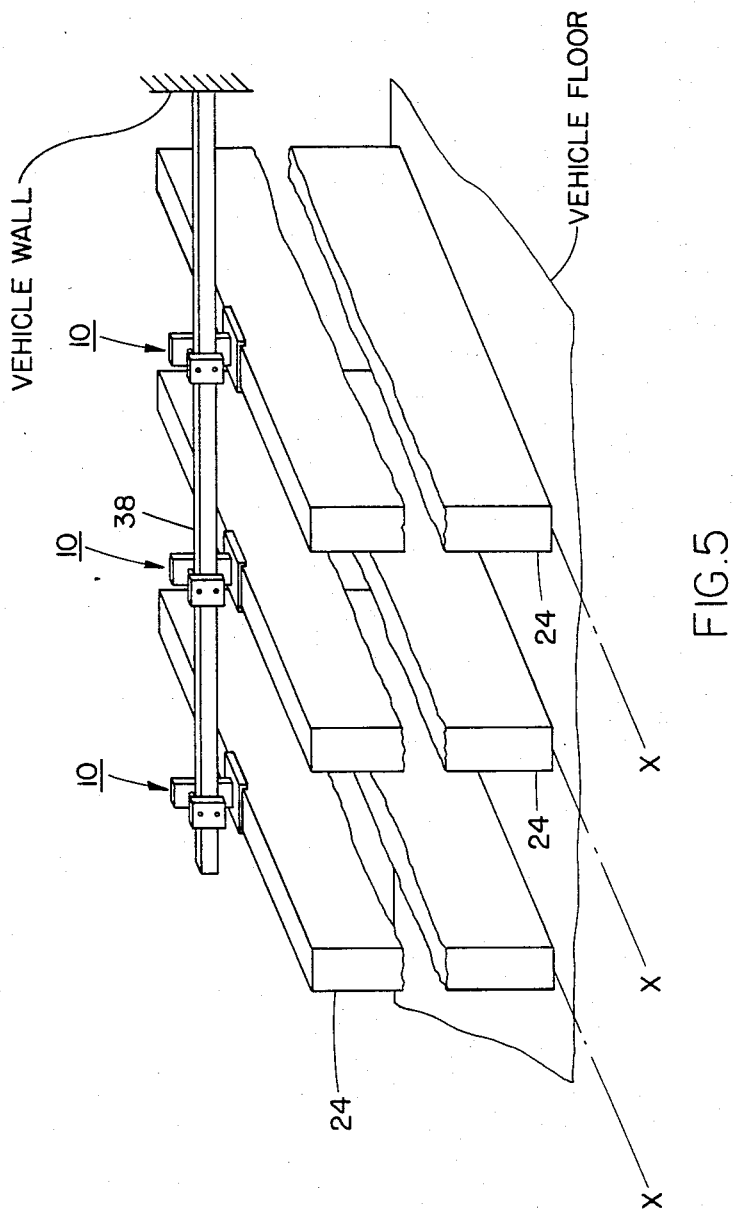
FIG. 5 is a generally schematic perspective view of the assembled frame fixture.

FIG. 5 illustrates a number of switchgears 24 spaced in a suitable transport vehicle. Each switchgear can be readily toppled about a base axis X towards an adjacent located switchgear, while being stable in all other directions. Through the interconnection of each frame fixture 10 by means of the cargo bar 38, there is formed a rigid, stabilized structure. The end of the cargo bar 38 may be fastened to the vehicle wall VW for additional support.

From the foregoing, it is apparent that the objects of the present invention have been fully accomplished. As a result of the present invention, a novel frame fixture has been provided. Although a preferred embodiment of the principles of this invention has been described and illustrated in detail herein, it should be realized that the same are not limited to the particular configuration shown in the drawings, and the modifications thereof are contemplated and can be made without departing from the broad spirit and scope of this invention as defined in the appended claims.

What is claimed is:

1. A frame fixture apparatus for stabilizing goods within a transport vehicle, wherein said goods include a plurality of breakable equipment items which tend to topple about one pivot plane and are stable in other directions, said items being arranged in spaced relationships in said vehicle whereby said items tend to topple towards each other, and said apparatus including a plurality of clamping devices for interlinking said items and forming a rigidly interconnected stabilized structure preventing toppling of said items, each said clamping device comprising:
   a. a base having a gripping means for gripping the edges of a surface of said item on which said base is positioned;
   b. an upright post having a pair of slots therein, said post being affixed to said base so as to provide a surface in coplanar relationship with the posts on the bases arranged on the other items in said vehicle;
   c. a plate having a pair of holes therein;
   d. means for attaching said plate to said post; and
   e. an elongate cargo bar extending between said items in the toppling plane of said items intermediate each said post and plate so as to be clampingly engaged therebetween by said attaching means and to form a rigidly interlinked bracing frame structure with said items.

2. An apparatus as defined in claim 1, said means for attaching said plate to said post comprising a pair of carrier bolts.

3. An apparatus as defined in claim 1, said cargo bar having at least one end fastened to a wall of said transport vehicle.

4. An apparatus as defined in claim 1, each said base having oppositely disposed curved ends to grip the edges of the surface of the equipment item to form a contact surface between said frame fixture and said equipment item wherein said item is prevented from moving transversely relative to the base of said frame fixture.

5. An apparatus as defined in claim 4, comprising pads affixed to said base along the contact surface with said equipment item to provide a protective seal between said item and said base.

6. An apparatus as defined in claim 5, said pads comprising a soft, resilient material.

* * * * *